(12) United States Patent
Kato et al.

(10) Patent No.: US 8,520,007 B2
(45) Date of Patent: Aug. 27, 2013

(54) GRAPHIC DRAWING DEVICE AND GRAPHIC DRAWING METHOD

(75) Inventors: Yoshiyuki Kato, Tokyo (JP); Akira Torii, Tokyo (JP); Hiroyasu Negishi, Tokyo (JP); Ryohei Ishida, Tokyo (JP); Masaki Hamada, Tokyo (JP)

(73) Assignee: Mitsubishi Electronic Corporation, Tokyo (JP)

( * ) Notice: Subject to any disclaimer, the term of this patent is extended or adjusted under 35 U.S.C. 154(b) by 473 days.

(21) Appl. No.: 12/810,192

(22) PCT Filed: Jan. 15, 2008

(86) PCT No.: PCT/JP2008/050350
§ 371 (c)(1),
(2), (4) Date: Jun. 23, 2010

(87) PCT Pub. No.: WO2009/090726
PCT Pub. Date: Jul. 23, 2009

(65) Prior Publication Data
US 2010/0271382 A1 Oct. 28, 2010

(51) Int. Cl.
*G06T 11/00* (2006.01)
*G09G 5/24* (2006.01)
*G09G 5/399* (2006.01)
*G09G 5/36* (2006.01)

(52) U.S. Cl.
USPC ........ 345/469.1; 345/467; 345/468; 345/469; 345/470; 345/471; 345/539; 345/556

(58) Field of Classification Search
USPC ................................. 345/539, 467–472.3, 556
See application file for complete search history.

(56) References Cited

U.S. PATENT DOCUMENTS

| | | | | |
|---|---|---|---|---|
| 5,155,822 A | * | 10/1992 | Doyle et al. | 711/202 |
| 5,898,439 A | * | 4/1999 | Takazawa | 345/441 |
| 6,982,724 B2 | | 1/2006 | Frisken et al. | |
| 2003/0112233 A1 | | 6/2003 | Miida et al. | |
| 2004/0189655 A1 | | 9/2004 | Perry et al. | |
| 2004/0189663 A1 | | 9/2004 | Perry et al. | |

FOREIGN PATENT DOCUMENTS

| | | |
|---|---|---|
| JP | 6-274641 A | 9/1994 |
| JP | 7-296176 A | 11/1995 |
| JP | 11-31233 A | 2/1999 |
| JP | 2000-235383 A | 8/2000 |
| JP | 2003-6675 A | 1/2003 |
| JP | 2006-521629 A | 9/2006 |
| JP | 2007-529788 A | 10/2007 |
| WO | 03/096275 A2 | 11/2003 |

* cited by examiner

*Primary Examiner* — Aaron M Richer
*Assistant Examiner* — Robert Craddock
(74) *Attorney, Agent, or Firm* — Birch, Stewart, Kolasch & Birch, LLP

(57) ABSTRACT

A distance information generating unit 4 for rasterizing minute line segments divided by a curved line dividing unit 2 through a combination of straight line cells and corner cells to generate distance information corresponding to a pixel 12 of a display and an edge rasterizing unit 7 for rasterizing edge information about the minute line segments divided by the curved line dividing unit 2 are disposed, and a mapping unit 10 determines whether the pixel 12 is located inside or outside by using the edge information rasterized by the edge rasterizing unit 7, and maps the distance information generated by the distance information generating unit 4 onto the antialiasing intensity 11 of a component 13 included in the pixel 12 according to the results of the inside or outside determination.

14 Claims, 12 Drawing Sheets

GRAPHIC DRAWING DEVICE AND GRAPHIC DRAWING METHOD

FIELD OF THE INVENTION

The present invention relates to a graphic drawing device for and a graphic drawing method of converting a two-dimensional object defined in a vector format to a distance field to carry out antialiasing drawing.

BACKGROUND OF THE INVENTION

Because a two-dimensional object defined in a vector format is provided by an expression, such as a Bezier curve or a spline curve, the two-dimensional object has a feature that it can be graphically drawn without any jaggy occurring even if it is enlarged or reduced like a bitmapped image.

For example, a TrueType outline font and an SVG (Scalable Vector Graphics) using W3C are examples of this vector graphics processing.

Furthermore, as a low level API (Application Programming Interface) of vector graphics, OpenVG specifications have been drawn up and a graphics library and hardware which comply with OpenVG have been developed.

In vector graphics, in order to display the jaggy of an edge portion smoothly, antialiasing drawing is needed.

As antialiasing drawing methods, for example, a super sampling method (refer to patent reference 1) of dividing a pixel into a plurality of subpixels, and calculating a luminance value from an occupation ratio of area, and a method (refer to patent reference 2) of calculating a luminance value from a distance from the center of a pixel are provided.

In accordance with the super sampling method or a multisample method, a pixel is further divided into smaller subpixels, and the value of the pixel is determined from the average of the values of these subpixels.

For example, one pixel is divided into 4×4=16 subpixels, each of the 16 virtual subpixels is subjected to drawing, and the average of the values of those subpixels is finally determined as the last value of the pixel.

Accordingly, in the case of using this method, because the drawing time increases in proportion to the number of subpixels, it is difficult to carry out real time drawing at a high speed.

Therefore, in order to implement the drawing at a high speed, it is necessary to perform the arithmetic processing on the subpixels in parallel, and hence the hardware scale increases.

In addition, in this method, the luminance value cannot be expressed without providing gradations (in the above-mentioned case, it can be expressed only with 16 gradations). Therefore, because the luminance value to be drawn is not calculated correctly, any edge line cannot be drawn smoothly. As a result, the occurrence of jaggy cannot be prevented certainly and the displayed image may degrade.

On the other hand, in accordance with the method of calculating the luminance value of a pixel from the distance from the center of the pixel to a straight line, the distance to the straight line has to be calculated for each pixel. Furthermore, in a case of carrying out antialiasing drawing of a curved line defined in a vector format, after the curved line is divided into minute line segments, the shortest one of the distances from each pixel to the minute line segments has to be selected.

Therefore, it is necessary to calculate the distances in advance from the center of each pixel to be drawn to all the divided minute line segments. In following patent reference 2, only linear antialiasing is described. However, it is clear that in a case in which the object is a complicated curved line, the amount of arithmetic operation of calculating distances becomes huge.

[Patent reference 1] PCT WO03/096275A2
[Patent reference 2] JP,6-274641,A (paragraph number [0014] and FIG. 1)

Because conventional graphic drawing devices are constructed as mentioned above, a problem is that in order to implement high-speed real time drawing, it is necessary to perform an arithmetic process on subpixels in parallel, and hence the hardware scale increases. A further problem is that because any edge line cannot be drawn smoothly, the occurrence of jaggy cannot be prevented certainly and the displayed image may degrade.

The present invention is made in order to solve the above-mentioned problems, and it is therefore an object of the present invention to provide a graphic drawing device and a graphic drawing method which can implement correct antialiasing drawing with a small amount of arithmetic operation without causing any degradation in the displayed image.

DISCLOSURE OF THE INVENTION

A graphic drawing device in accordance with the present invention includes a distance information generating means for rasterizing minute line segments divided by a curved line dividing means through a combination of straight line cells and corner cells to generate distance information corresponding to a pixel of a display and an edge rasterizing means for rasterizing edge information about the minute line segments divided by the curved line dividing means, and a mapping means determines whether the pixel is located inside or outside by using the edge information rasterized by the edge rasterizing means, and maps the distance information generated by the distance information generating means onto antialiasing intensity of a component included in the pixel according to a result of the inside or outside determination.

Therefore, the present invention offers an advantage of being able to implement correct antialiasing drawing with a small amount of arithmetic operation without causing any degradation in the displayed image.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
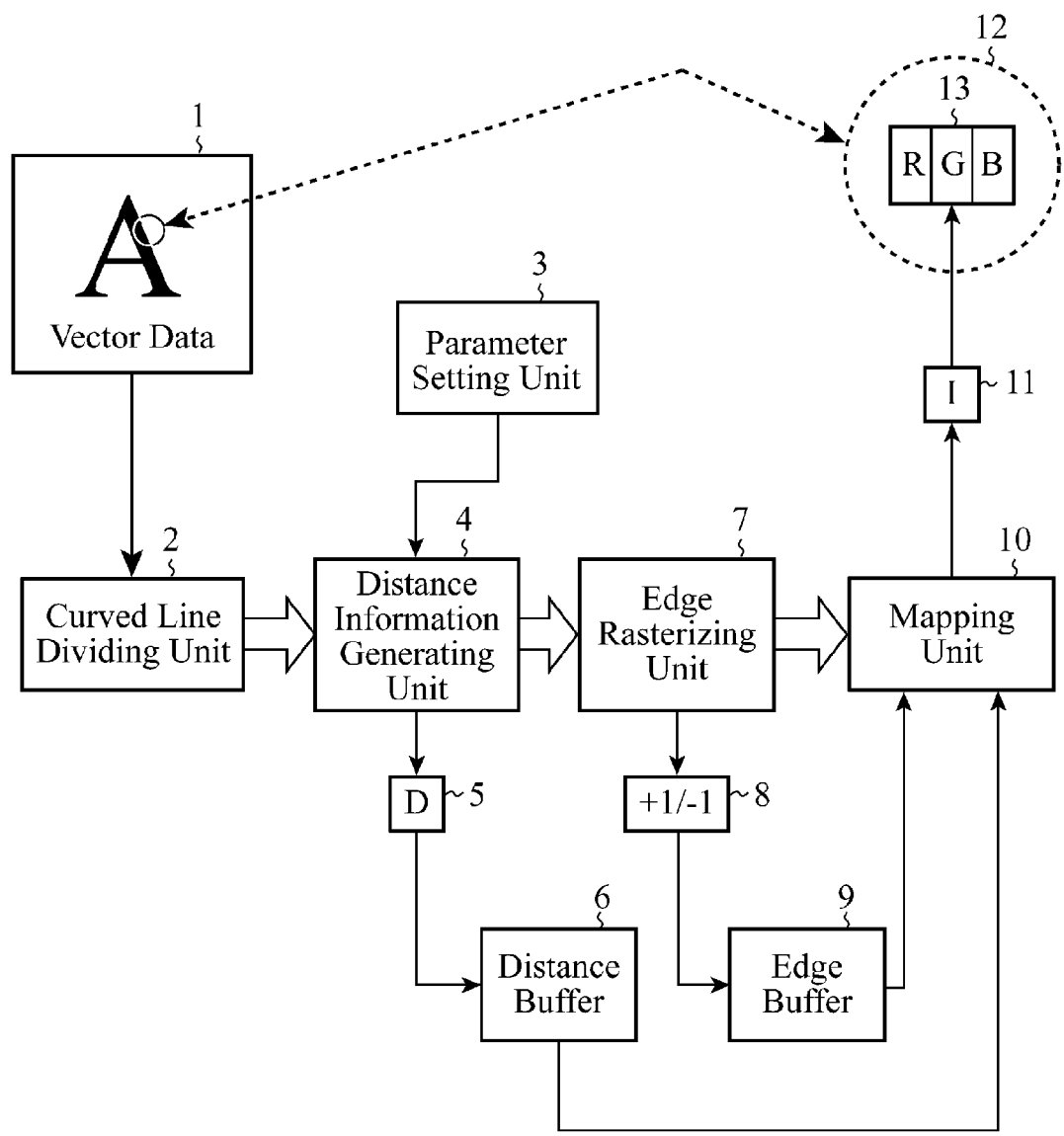
FIG. 1 is a block diagram showing a graphic drawing device in accordance with Embodiment 1 of the present invention.

FIG. 1 is a block diagram showing a graphic drawing device in accordance with Embodiment 1 of the present invention. In the figure, vector data 1 is a graphic object (an arbitrary closed surface or an arbitrary stroke) comprised of arbitrary path data, such as a Bezier curve, a spline curve, or a straight line.

A curved line dividing unit 2 carries out a process of carrying out matrix transformation of curved apex coordinates and control point coordinates represented by the vector data (in this specification, a "curved line" is conceptually defined to include a straight line, as well as a so-called curved line) to divide the matrix-transformed curved line into minute line segments. The curved line dividing unit 2 constructs a curved line dividing means.

A parameter setting unit 3 carries out a process of setting an external cutoff and an internal cutoff as antialiasing setting parameters for specifying the intensity of antialiasing which is to be performed on the path data which construct the vector data 1.

A distance information generating unit 4 carries out a process of rasterizing the minute line segments, into which the matrix-transformed curved line is divided by the curved line dividing unit 2, through a combination of straight line cells and corner cells by using the antialiasing setting parameters set by the parameter setting unit 3 to generate distance information 5 corresponding to each pixel 12 of a display (the distance information 5 is a value ranging from "−1" to "1" and is expressed as a value of "0" when the pixel is on an edge line, and, when the distance information is a negative number, shows that the pixel is located outside the object).

A distance buffer 6 is a memory for storing the distance information 5 generated by the distance information generating unit 4.

A distance information generating means is comprised of the parameter setting unit 3, the distance information generating unit 4, and the distance buffer 6.

An edge rasterizing unit 7 rasterizes edge information of the minute line segments into which the matrix-transformed curved line is divided by the curved line dividing unit 2, and stores the rasterized edge information 8 in an edge buffer 9.

The edge buffer 9 is a memory for storing the edge information 8 rasterized by the edge rasterizing unit 7.

An edge rasterization means is comprised of the edge rasterizing unit 7 and the edge buffer 9.

A mapping unit 10 carries out a process of determining whether each pixel 12 is located inside or outside the object by using the edge information 8 stored in the edge buffer 9, and mapping the distance information 5 stored in the distance buffer 6 onto the antialiasing intensity 11 of each component 13 included in each pixel 12 according to the results of the determination of whether each pixel is located inside or outside the object.

The mapping unit 10 constructs a mapping means.

Each pixel 12 can include one or more components 13 (e.g., in a case in which an output device is of "RGB" type, each pixel typically includes red, blue and green components).

The anti-aliased intensity of each pixel can be drawn on the display, such as a CRT or an LCD, as a part of an image.

In the example of FIG. 1, it is assumed that each of the curved line dividing unit 2, the parameter setting unit 3, the distance information generating unit 4, the edge rasterizing unit 7, and the mapping unit 10, which are the components of the graphic drawing device, is comprised of a piece of hardware exclusively used in the graphic drawing device (e.g., a semiconductor circuit board on which an MPU is mounted). As an alternative, in a case in which the graphic drawing device consists of a computer, a graphic drawing program in which the descriptions of processes carried out by the curved line dividing unit 2, the parameter setting unit 3, the distance information generating unit 4, the edge rasterizing unit 7, and the mapping unit 10 are described can be stored in a memory of the computer, and a CPU of the computer can execute the graphic drawing program stored in the memory.

Figure 2:
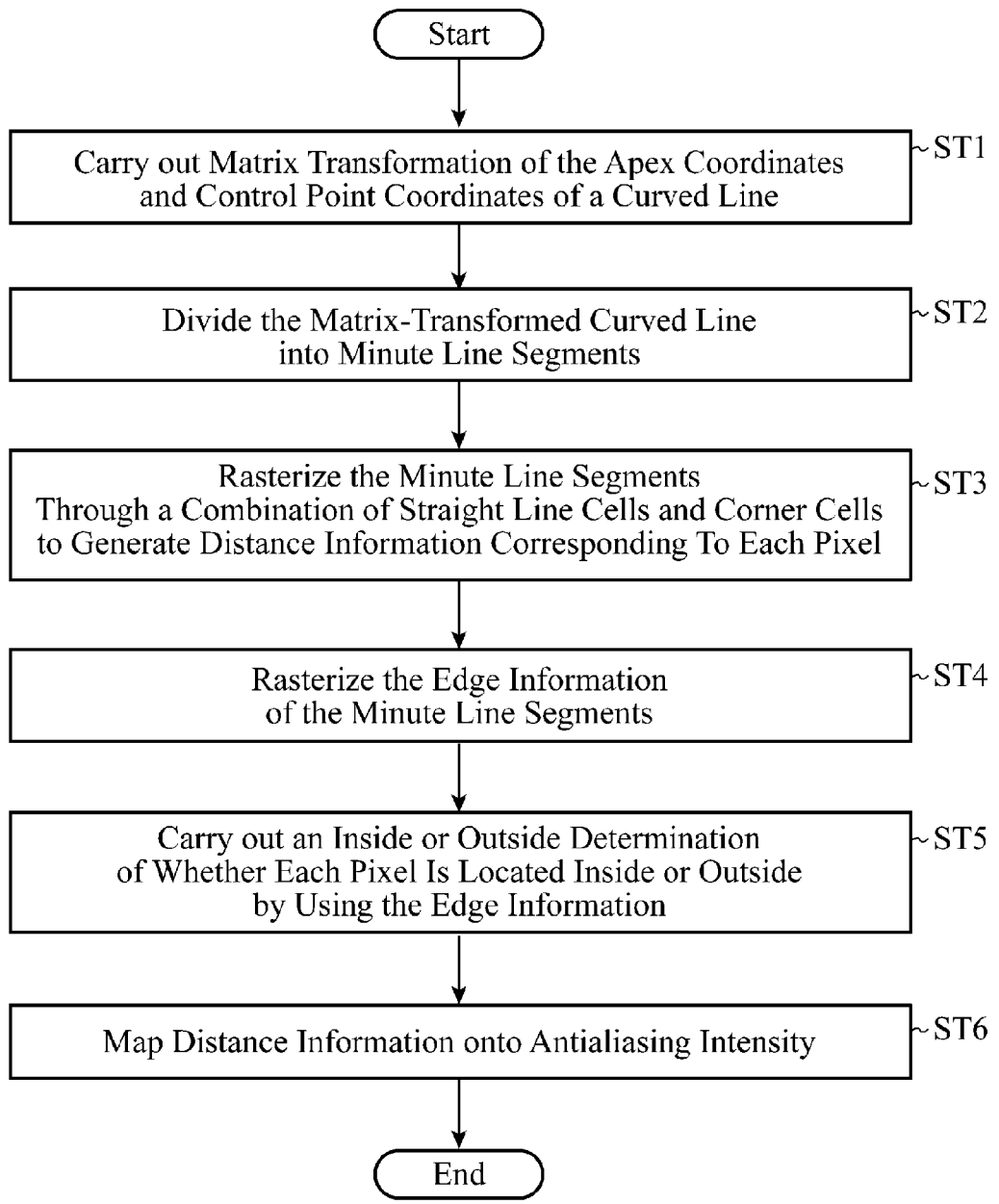
FIG. 2 is a flow chart showing a graphic drawing method in accordance with Embodiment 1 of the present invention.

FIG. 2 is a flow chart showing a graphic drawing method in accordance with Embodiment 1 of the present invention.

Next, the operation of the graphic drawing device will be explained.

When receiving the vector data 1, the curved line dividing unit 2 carries out matrix transformation of the apex coordinates and the control point coordinates of the curved line expressed by the vector data 1 (step ST1).

Accordingly, the curved line dividing unit can perform a process, such as enlargement, reduction, rotation, or parallel translation, on the path data which construct the vector data 1.

For example, by using a 4×4 matrix as the matrix, the curved line dividing unit can carry out projective transformation, thereby being able to provide a three-dimensional bird's-eye view display effect.

After carrying out matrix transformation of the apex coordinates and the control point coordinates of the curved line expressed by the vector data 1, the curved line dividing unit 2 divides the matrix-transformed curved line into minute line segments (step ST2).

More specifically, the curved line dividing unit 2 carries out a process of approximately dividing the matrix-transformed curved line into a plurality of minute line segments.

The number of divisions is determined by the curvature and size of the curved line, and is minimized in such away that the curved line is approximated adequately visually by the plurality of minute line segments.

Figure 3:
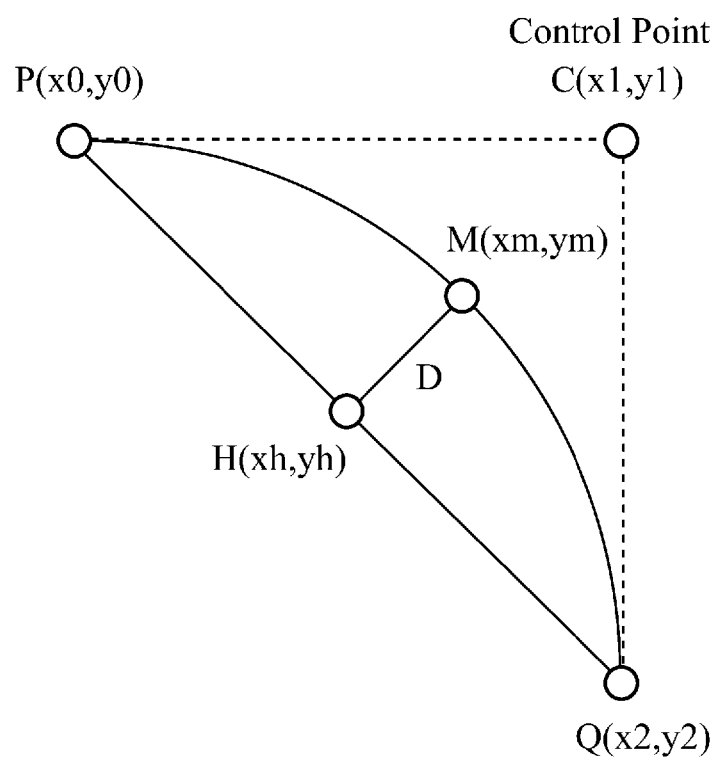
FIG. 3 is an explanatory drawing showing a second-order Bezier curve PCQ.

For example, in the case in which the object is a secondary Bezier curve PCQ as shown in FIG. 3, the Bezier curve is defined by the following parametric form using a parameter t ($0 \leq t \leq 1$).

In this case, P(x0, y0) and Q(x2, y2) are apex coordinates, and C(x1, y1) is control point coordinates.

$$x(t)=(1-t)^2 \times x0+2\times(1-t)\times t\times x1+t^2\times x2$$

$$y(t)=(1-t)^2 \times y0+2\times(1-t)\times t\times y1+t^2\times y2$$

Therefore, the middle point M(xm, ym) on the Bezier curve is given as follows.

$$xm = x(0.5) = \frac{x0}{4} + \frac{x1}{2} + \frac{x2}{4} \quad \text{[Equation 1]}$$
$$ym = y(0.5) = \frac{y0}{4} + \frac{y1}{2} + \frac{y2}{4}$$

The middle point H(xh, yh) of the straight line PQ is given as follows.

$$xh = \frac{x0 + x2}{2} \quad \text{[Equation 2]}$$
$$yh = \frac{y0 + y2}{2}$$

By using the distance D from the middle point M(xm, ym) to the middle point H(xh, yh), the number of divisions N is determined as follows.

In this case, T is a constant, and, if T=0, the number of divisions becomes infinity and the process is equivalent to a true curved line process.

$$N = 1 + \sqrt{\frac{D}{T}} \quad \text{[Equation 3]}$$

The parameter setting unit 3 sets an external cutoff and an internal cutoff as antialiasing setting parameters for specifying the intensity of antialiasing which is to be performed on the path data which construct the vector data 1.

For example, by increasing the cutoff values, the parameter setting unit can increase the blurring of the edge portion, whereas by decreasing the cutoff values, the parameter setting unit can decrease the blurring of the edge portion.

By setting the cutoff values to "0", the parameter setting unit can make the process equivalent to a process having no antialiasing and can make the edge have jaggy.

Furthermore, by making the external cutoff value larger than the internal cutoff value, the parameter setting unit can produce an effect of thickening the whole of the object. In contrast, by making the external cutoff value smaller than the internal cutoff value, the parameter setting unit can produce an effect of thinning the whole of the object.

After the curved line dividing unit 2 divides the matrix-transformed curved line into the minute line segments, the distance information generating unit 4 rasterizes the divided minute line segments through a combination of straight line cells and corner cells by using the antialiasing setting parameters set by the parameter setting unit 3 to generate distance information 5 corresponding to each pixel 12 of the display, and stores the distance information 5 in the distance buffer 6 (step ST3).

In this embodiment, the distance information 5 corresponding to each pixel is a value ranging from "−1" to "1", and is expressed as a value of "0" when the pixel is on an edge line. Furthermore, when the distance information is a negative number, it shows that the pixel is located outside the object.

Figure 4:
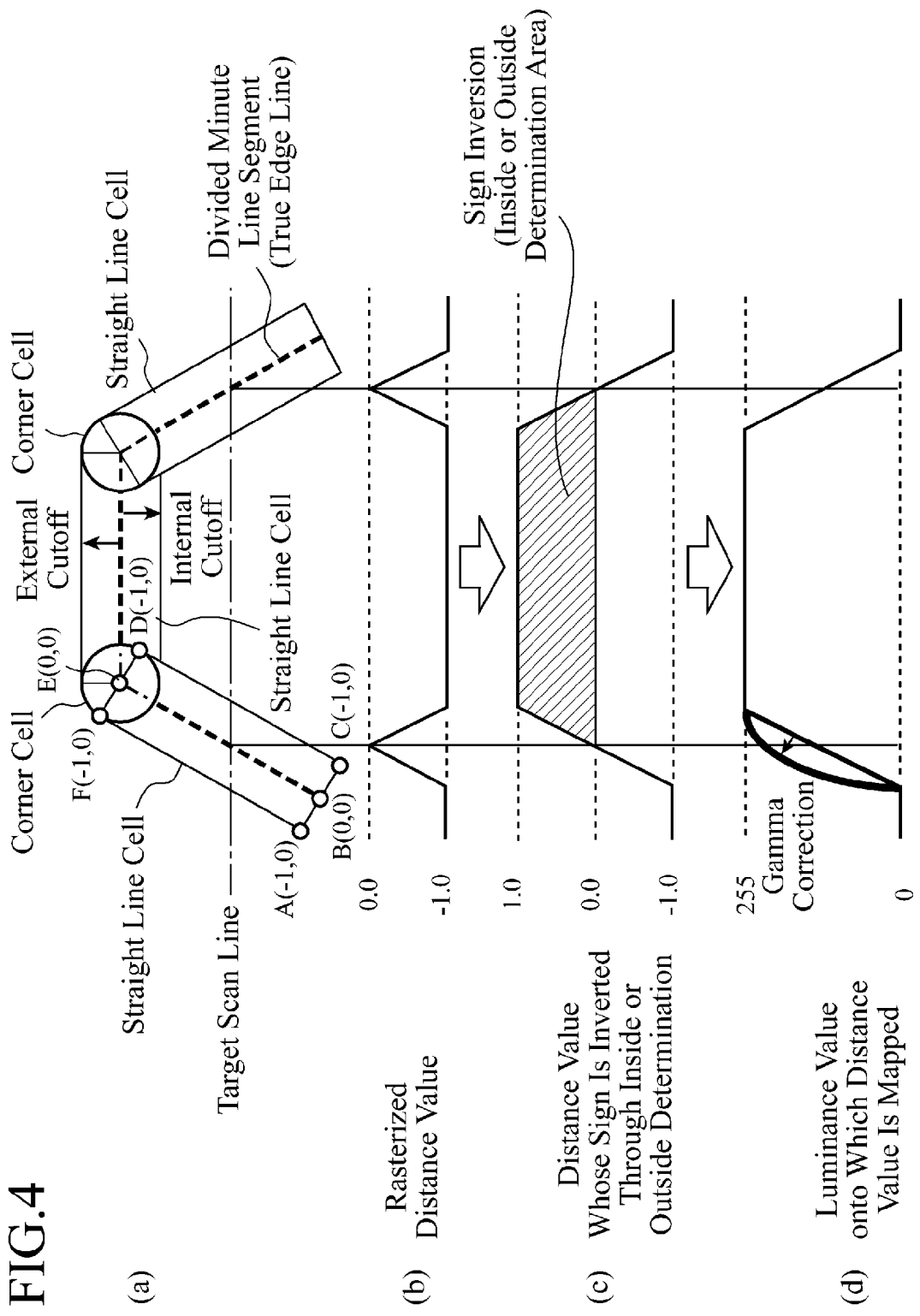
FIG. 4 is an explanatory drawing showing a state in which a rasterizing process is performed on minute line segments through a combination of straight line cells and corner cells.

FIG. 4 is an explanatory drawing showing a state in which the rasterizing process is performed on the minute line segments through a combination of straight line cells and corner cells.

In the example of FIG. 4, each straight line cell is comprised of a rectangle ABEF on a side of the external cutoff, and a rectangle BCDE on a side of the internal cutoff.

A comparison between the external cutoff value and the internal cutoff value is made, and the larger one of them is selected as the widths of the rectangle ABEF and the rectangle BCDE.

Because each minute line segment is also a true edge line, a point on each minute line segment is expressed as a distance value of "0".

In this stage, because no inside or outside determination process has not been performed on the object yet, the distance value of each vertex on the cutoff side is uniformly set to "−1".

Therefore, the distance values of the vertexes of the rectangle ABEF are defined as "−1, 0, 0, −1", and the distance values of the vertexes of the rectangle BCDE are defined as "0, −1, −1, 0".

After the rectangle ABDE and the rectangle BCDE are determined, the distance information 5 (distance value) is generated for each pixel through the rasterizing process.

In the rasterizing process, increments of the distance value in both the X-direction and the Y-direction are calculated beforehand and a linear interpolation process is carried out in a direction of a scan line, so that the distance value can be calculated at a high speed.

On the other hand, each corner cell consists of a perfect circle having a radius equal to the external cutoff value or the internal cutoff value.

The distance value at the central point of the circle is expressed as "0", and the distance value on the circumference of the circle is expressed as "−1".

Although the distance from each pixel to the central point can be calculated by using the following equation, it can be calculated at a higher speed by approximate calculation using a look-up table.

$$\sqrt{x^2 + y^2} \quad \text{[Equation 4]}$$

A straight line cell and a corner cell are rasterized per pixel into the distance buffer 6 while they overlap each other.

Therefore, in order to write the largest distance value in the distance buffer 6, when writing the distance value in the distance buffer 6, the distance information generating unit 4 makes a comparison between the distance value of the source and that of the destination, and writes the larger one of the distance values (the distance value closer to 0) in the distance buffer.

By thus dividing the path data which construct the vector data 1 into the minute line segments according to the number N of divisions optimum for the shape, and performing the rasterizing process on the minute line segments through a combination of straight line cells and corner cells, the distance information generating unit can generate correct distance information 5 necessary for the antialiasing process even for a connecting portion between minute line segments at a high speed without forming a crevice at the connecting portion.

After the curved line dividing unit 2 divides the matrix-transformed curved line into the minute line segments, the edge rasterizing unit 7 rasterizes the edge information about the divided minute line segments and stores the rasterized edge information 8 in the edge buffer 9 (step ST4).

When rasterizing the edge information 8, the edge rasterizing unit calculates coordinates to be drawn from the starting point coordinates and the endpoint coordinates of the minute line segments by using, for example, a DDA (Digital Differential Analyzer: digital differential analyzer).

Figure 6:
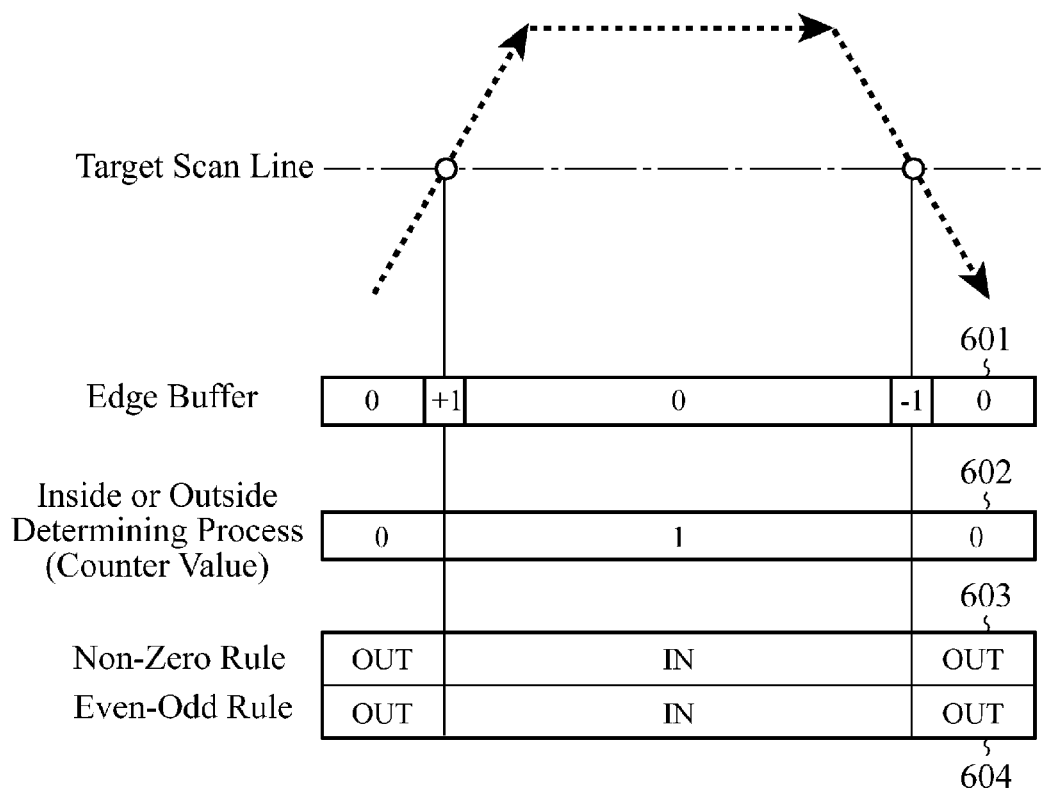
FIG. 6 is an explanatory drawing showing an inside or outside determining process which is performed on the edges of minute line segments.
Figure 7:
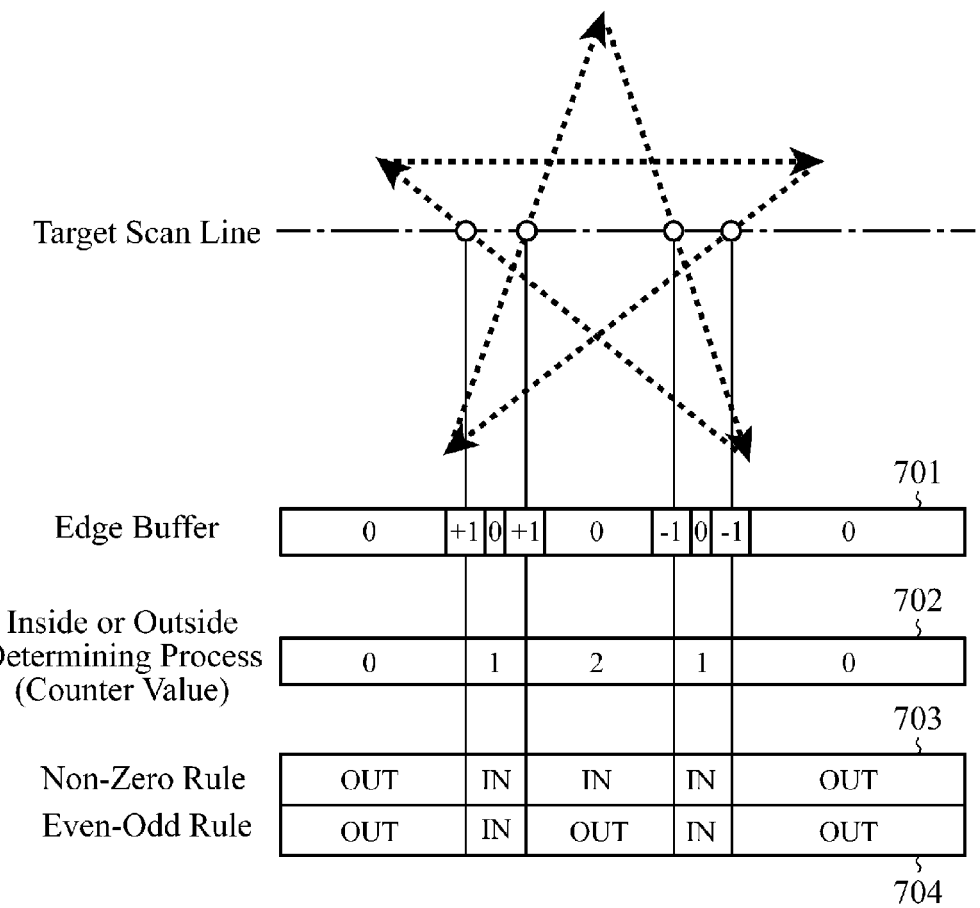
FIG. 7 is an explanatory drawing showing an inside or outside determining process which is performed on the edges of star-shaped path data.

As shown in FIGS. 6 and 7, when the edge is upward, the edge rasterizing unit carries out a process of adding "+1" to the edge data stored in the edge buffer 9 (the edge information 8 in the course of rasterizing being carried out), whereas when the edge is downward, the edge rasterizing unit carries out a process of subtracting "−1" from the edge data stored in the edge buffer 9.

For example, in a case in which it is defined that up to 128 edges can overlap one another at the same coordinates, 8 bits ($2^7$=128+sign bit) are needed as the bit width in the depth direction of the edge buffer 9.

After the rasterizing process on one piece of the path data is completed, the mapping unit 10 reads the distance information 5 and the edge information 8 in units of a bit from the distance buffer 6 and the edge buffer 9.

The mapping unit 10 carries out the inside or outside determination process of determining whether the pixel 12 in question is located inside or outside the object by using the edge information 8 (step ST5). According to the determination result of the inside or outside determination process, the mapping unit maps the distance information 5 onto the antialiasing intensity 11 of each component 13 included in the pixel 12 (step ST6).

The inside or outside determination process of determining whether the pixel 12 is located inside or outside the object is carried out, as shown in, for example, FIGS. 6 and 7.

FIG. 6 shows a case in which the edges of the minute line segments shown in FIG. 4 are processed, and FIG. 7 shows a case in which the edges of star-shaped path data are processed.

A counter used for the inside or outside determination has an initial value of "0", and a value 601 or 701 read from the edge buffer 9 is sequentially added to the counter (refer to 602 and 702).

In a case of using, as a winding fill rule, a Non-Zero rule (a non-zero rule), it is determined that a pixel whose counter value is "0" is located outside the object, and it is determined that a pixel whose counter value is other than "0" is located inside the object (refer to 603 and 703).

In contrast, in a case of using, as a winding fill rule, an Even-Odd rule (an even-odd rule), it is determined that a pixel whose least significant bit of the counter value is "0" is located outside the object, and it is determined that a pixel whose least significant bit of the counter value is "1" is located inside the object (refer to 604 and 704).

The counter is reset to "0" after the process on each scan line is completed.

Each negative distance value read from the distance buffer 6 is subjected to a process of inverting the sign of the negative distance value when the negative distance value is calculated for a region which is judged to be located inside the object, as shown in FIG. 4(c).

When the external cutoff value differs from the internal cutoff value, the mapping unit does not directly map a region having a distance value ranging from "−1" to "1" onto the antialiasing intensity 11, but maps a region having an effective distance value corresponding to the cutoff values onto the antialiasing intensity 11.

Furthermore, the mapping unit performs a luminance correction process optimal for the display on a sloped straight line by using, for example, a gamma correction or the like (refer to FIG. 4(d)).

By thus carrying out the inside or outside determination process using the edge information read from the edge buffer 9, and then carrying out the conversion process of converting the distance information 5 read from the distance buffer 6 on the basis of the inside or outside determination result, the graphic drawing device can calculate the antialiasing intensity 11 correctly.

The distance buffer 6 and the edge buffer 9 can have capacities enough to store the distance information 5 and the edge information 8 about the full screen of the display respectively, or can have capacities enough to store the distance information 5 and the edge information 8 about a part of the full screen respectively.

In a case in which the distance buffer and the edge buffer have capacities enough to store the distance information and the edge information about a part of the full screen respectively, the rasterizing process by the distance information generating unit 4 and the edge rasterizing unit 7 and the mapping process by the mapping unit 10 are carried out a number of times according to divided areas.

In this case, because the capacities of the distance buffer 6 and the edge buffer 9 can be reduced to small ones, there is an advantage of being able to use a high-speed accessible memory.

In a case of carrying out the processes using a CPU, the distance information and the edge information about the part of the full screen amount have amounts which can be stored in an on-chip cache.

Also in a case of carrying out the processes using hardware exclusively used for the purpose, the processes can be carried out by using only a small-capacity internal memory without using any external memory.

Furthermore, in a case in which the vector data does not represent a closed surface enclosed by arbitrary path data, but represents a stroke having a line width specified by arbitrary path data, the inside or outside determination process including the winding fill rule becomes unnecessary.

Figure 8:
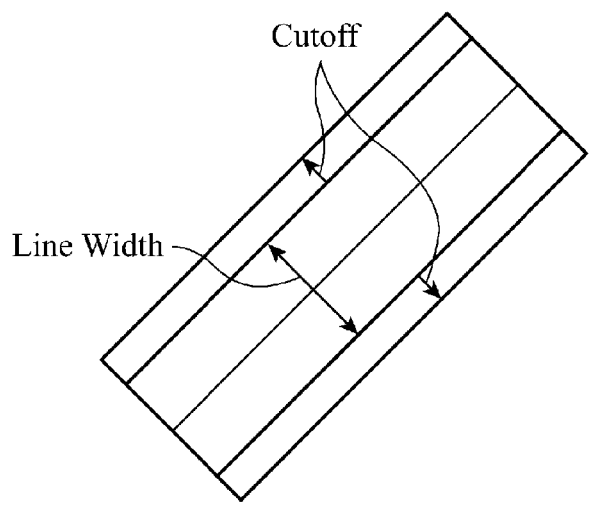
FIG. 8 is an explanatory drawing showing a state in which a straight line cell is decomposed into two rectangles each having a width which is equal to the addition of half the line width of the straight line cell and a cutoff.

As shown in FIG. 8, a straight line cell is decomposed into two rectangles each having a line width which is equal to the addition of half the line width of the straight line cell and a cutoff, and their distance values are rasterized. Similarly, also in a case of a corner cell, the distance value of a circle having a radius which is an addition of half the line width of the corner cell and a cutoff value is rasterized.

After that, the antialiasing intensity is calculated only by using the rasterized distance values. Therefore, for example, in a case of drawing a stroke font defined by only a frame, antialiasing drawing can be carried out without having to perform any rasterizing process on edges, and therefore the edge buffer becomes unnecessary.

As can be seen from the above description, in accordance with this Embodiment 1, the distance information generating unit 4 for rasterizing minute line segments into which a curved line is divided by the curved line dividing unit 2 through a combination of straight line cells and corner cells to generate distance information 5 corresponding to each pixel 12 of the display, and the edge rasterizing unit 7 for rasterizing the edge information about the minute line segments into which the curved line is divided by the curved line dividing unit 2 are disposed, and the mapping unit 10 is constructed in such a way as to determine whether each pixel 12 is located inside or outside the object by using the edge information 8 rasterized by the edge rasterizing unit 7, and map the distance information 5 generated by the distance information generating unit 4 onto the antialiasing intensity 11 of each component 13 included in each pixel 12 according to the results of the inside or outside determination. Therefore, the present embodiment offers an advantage of being able to implement correct antialiasing drawing with a small amount of arithmetic operation without causing any degradation in the displayed image.

Embodiment 2

Figure 9:
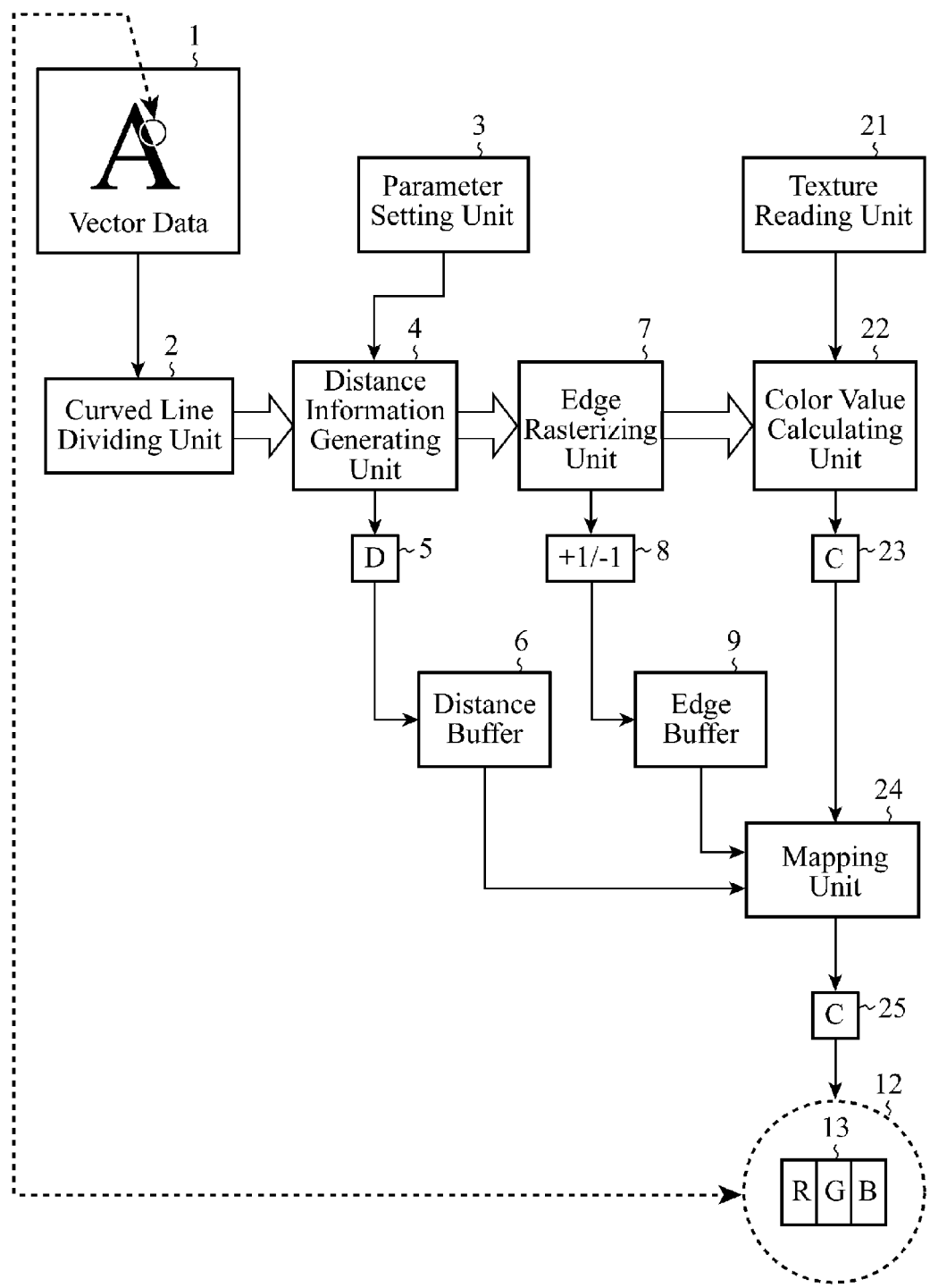
FIG. 9 is a block diagram showing a graphic drawing device in accordance with Embodiment 2 of the present invention.

FIG. 9 is a block diagram showing a graphic drawing device in accordance with Embodiment 2 of the present invention. In the figure, because the same reference numerals as those shown in FIG. 1 denote the same components or like components, the explanation of the components will be omitted hereafter.

A texture reading unit 21 carries out a reading process of reading texture data (image data about an image to be stuck on a two-dimensional object).

A color value calculating unit 22 carries out a process of performing a color gradation arithmetic operation and a texture arithmetic operation on the texture data read by the texture reading unit 21 to calculate a color value 23 of each component 13 included in each pixel 12.

A color value calculating means is comprised of the texture reading unit 21 and the color value calculating unit 22.

A mapping unit 24 maps distance information 5 onto antialiasing intensity in the same way that the mapping unit 10 shown in FIG. 1 does, and carries out alpha blend of the color value 23 calculated by the color value calculating unit 22 by using the antialiasing intensity onto which the distance information is mapped.

The mapping unit 24 constructs a mapping means.

In this Embodiment 2, a method of carrying out vector graphics processing with more general versatility, which is an extension of that in accordance with above-mentioned Embodiment 1, will be shown.

After the graphic drawing device carries out a rasterizing process of rasterizing the distance information and edge information about one piece of path data in the same way that the graphic drawing device in accordance with above-mentioned Embodiment 1 does, the color value calculating unit 22 performs a color gradation arithmetic operation and a texture arithmetic operation on the texture data read by the texture reading unit 21 to calculate the color value 23 of each component 13 included in each pixel 12.

Figure 10:
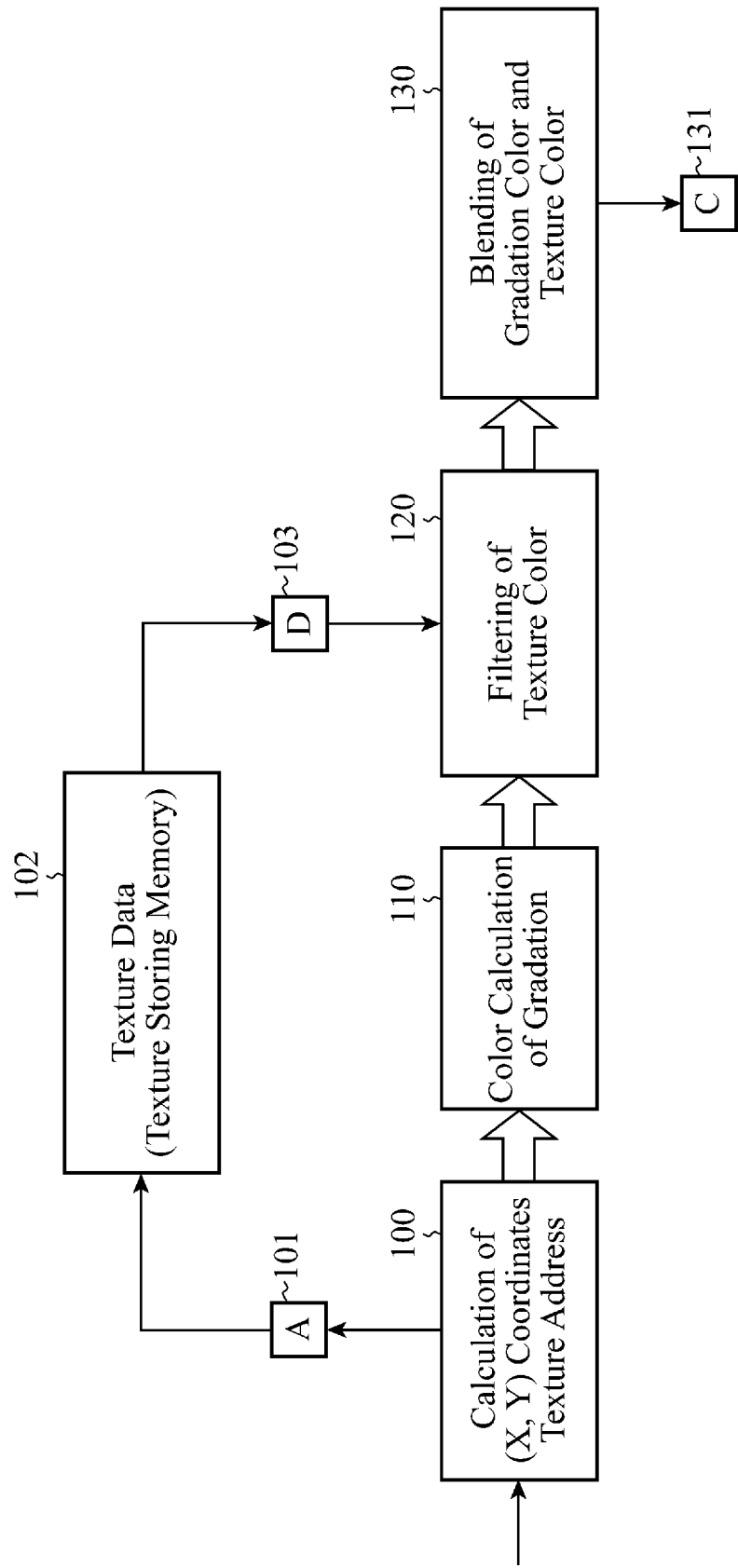
FIG. 10 is a flow chart showing a concrete example of the descriptions of a process carried out by a color value calculating unit 22.

FIG. 10 is a flow chart showing a concrete example of the descriptions of the process carried out by the color value calculating unit 22.

In FIG. 10, the color value calculating unit, in 100, calculates an address 101 required to read a texture color 103 which is sampling data from the texture data 102 from the X and Y coordinates of the path data. Information about a texture matrix is also used for the calculation of the X and Y coordinates.

The color value calculating unit, in 110, carries out the color gradation arithmetic operation. As the gradation, for example, there are the following types of gradation.
  Flat type
  Linear type
  Radial type The flat type gradation is a process of filling an area with a single color.

The linear type gradation is a process of, when the color values of two points are specified, calculating a color at an arbitrary point by using the distances from the two points to the arbitrary point by linear interpolation.

Figure 11:
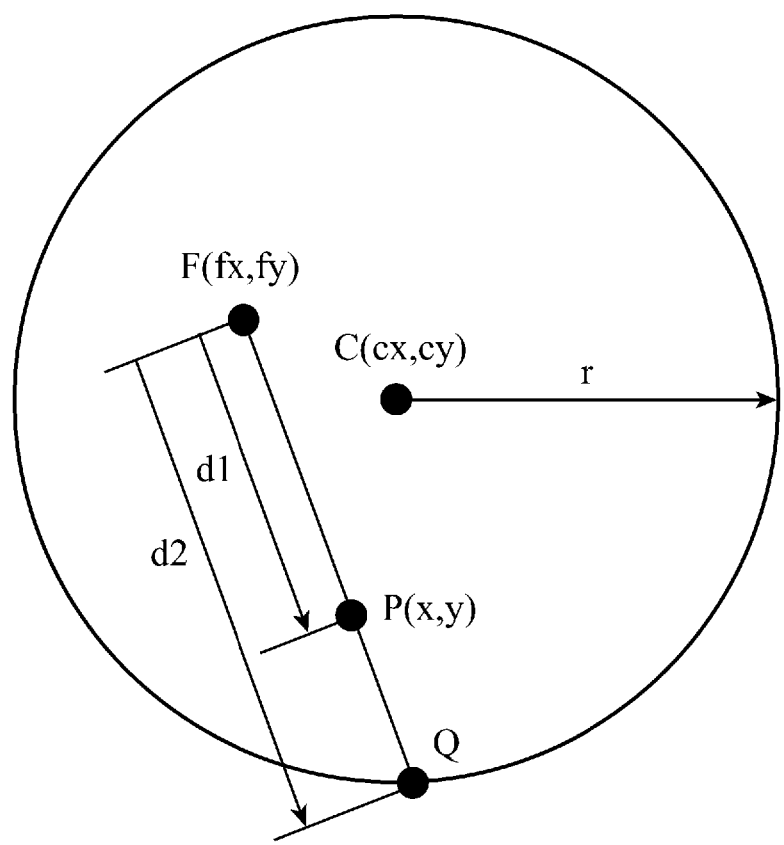
FIG. 11 is an explanatory drawing showing a radial type gradation.

The radial type gradation is a process of, when the color value of a central point C(cx, cy), the color value of an attention point F(fx, fy), and a radius r are specified, calculating a color value at an arbitrary point P(x, y) by using the gradient d1/d2 of the line segment FQ, as shown in FIG. 11.

The color value calculating unit, in 120, carries out a filtering process of filtering a plurality of texture colors 103 read from the texture data 102. In the filtering process, bilinear, mipmap, or bicubic is used.

The color value calculating unit, in 130, carries out a blending process of blending the gradation color calculated in 110 and the texture color filtered in 120.

In a case in which the color value calculating unit is implemented via hardware, a latency occurring until the texture color 103 is read from the texture data 102 is generally large.

For this reason, by calculating the texture address at the time of the rasterizing process performed by the distance information generating unit 4, and performing prefetching on a texture memory, the color value calculating unit can conceal the access latency.

Furthermore, by mounting a texture cache in the graphic drawing device, the latency can be shortened.

After mapping the distance information 5 onto antialiasing intensity in the same way that the mapping unit 10 shown in FIG. 1 does, the mapping unit 24 carries out alpha blend of the color value 23 calculated by the color value calculating unit 22 by using the antialiasing intensity onto which the distance information is mapped, and determines the results of the alpha blend as a last color 25.

Thus, when carrying out antialiasing drawing of the vector data 1, the graphic drawing device can produce a display of a gradation color and attachment of a texture image on an arbitrary graphics. As a result, there is provided an advantage of being able to implement a high-quality realistic expression.

Embodiment 3

Figure 12:
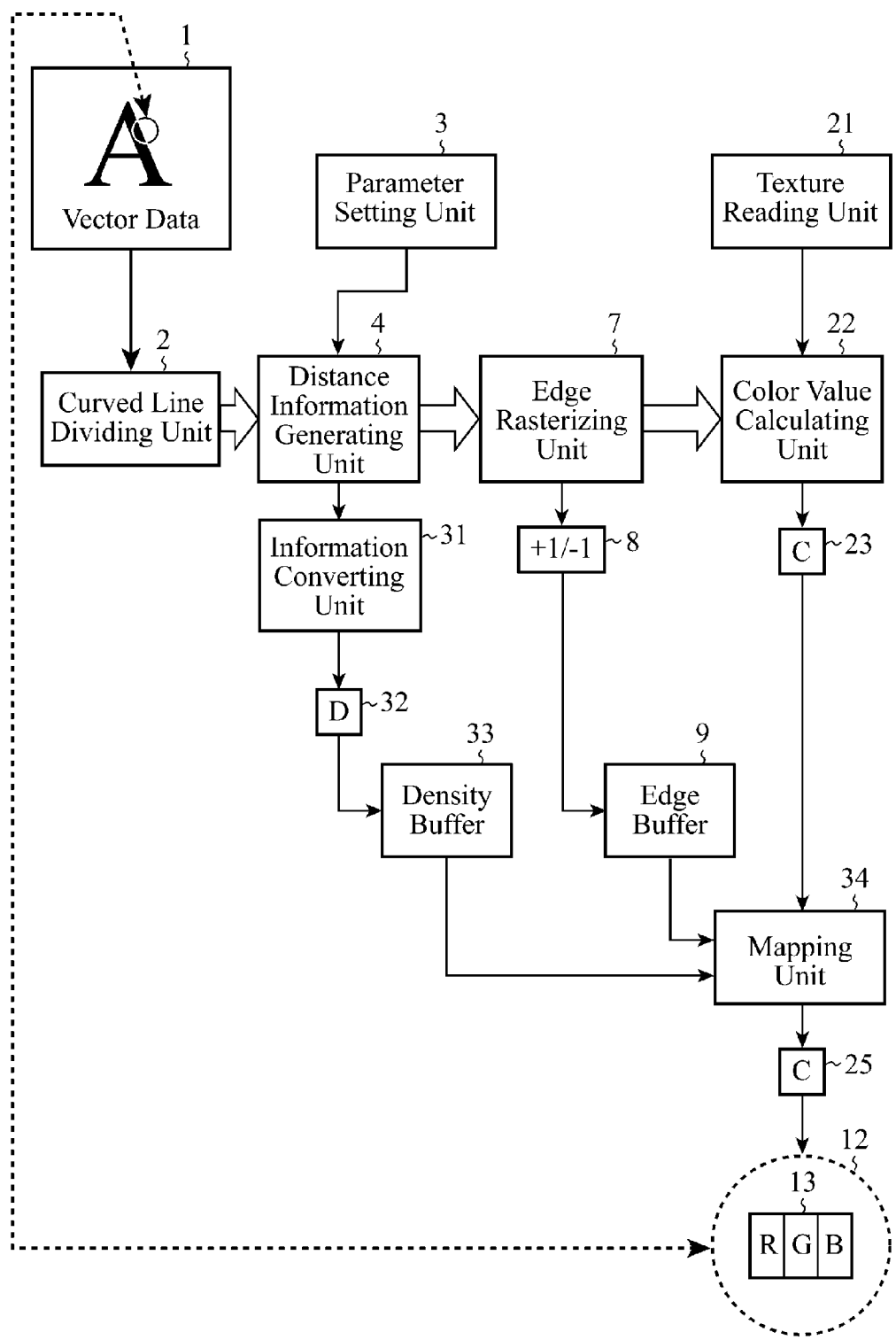
FIG. 12 is a block diagram showing a graphic drawing device in accordance with Embodiment 3 of the present invention.

FIG. 12 is a block diagram showing a graphic drawing device in accordance with Embodiment 3 of the present invention. In the figure, because the same reference numerals as those shown in FIG. 9 denote the same components or like components, the explanation of the components will be omitted hereafter.

An information converting unit 31 carries out a process of converting distance information 5 generated by a distance information generating unit 4 into density information 32, and storing the density information 32 in a density buffer 33.

The density buffer 33 is a memory for storing the density information 32 into which the distance information is converted by the information converting unit 31.

An information converting means is comprised of the information converting unit 31 and the density buffer 33.

A mapping unit 34 determines whether each pixel 12 is located inside or outside the object by using edge information 8 stored in an edge buffer 9, maps the density information 32 stored in the density buffer 33 onto the antialiasing intensity 11 of each component 13 included in each pixel 12 according to the results of the inside or outside determination, and further carries out alpha blend of a color value 23 calculated by a color value calculating unit 22 by using the antialiasing intensity onto which the density information is mapped.

The mapping unit 34 constructs a mapping means.

In above-mentioned Embodiments 1 and 2, each of the mapping units 10 and 24 maps the distance information 5 stored in a distance buffer 6 onto the antialiasing intensity 11 of each component 13 included in each pixel 12, as mentioned above. The mapping unit can alternatively convert the distance information 5 into density information 32, and can map the density information 32, instead of the distance information 5, onto the antialiasing intensity 11 of each component 13 included in each pixel 12.

In any scaling, in order to carry out correct antialiasing drawing, it is necessary to ensure distance information 5 having a sufficient degree of accuracy.

Therefore, even in a case of using either a fixed point format or a floating point format as the format of the distance buffer 6, a data bit length of around 32 bits is needed.

In contrast, when using the density information 32 which complies with a display instead of the distance information 5, the degree of accuracy of the density information can be maintained at a sufficient level even though the density information has shorter data bit length.

For example, in a case in which the display provides 256-level gray scale, correct antialiasing drawing can be implemented by making the density information have a data bit length of 8 bits.

In accordance with this Embodiment 3, the information converting unit 31 converts the distance information 5 generated by the distance information generating unit 4 into density information 32, and stores the density information 32 in the density buffer 33.

In the process of writing the density information 32 into the density buffer 33, the information converting unit makes a comparison between the density information of the source and that of the destination, and writes the larger one of the pieces of density information in the density buffer, like in the process of writing the distance information into the distance buffer 6.

After determining whether each pixel 12 is located inside or outside the object in the same way that the mapping units 10 and 24 shown in FIGS. 1 and 9 do, the mapping unit 34 maps the density information 32 stored in the density buffer 33 onto the antialiasing intensity 11 of each component 13 included in each pixel 12 according to the results of the inside or outside determination. The mapping unit further carries out alpha blend of the color value 23 calculated by the color value calculating unit 22 by using the antialiasing intensity onto which the density information is mapped in the same way that the mapping unit 24 shown in FIG. 9 does.

By thus using the density information 32 instead of the distance information 5, the capacity of the density buffer 33 can be reduced greatly compared with that of the distance buffer 6, and therefore it becomes able to reduce the hardware scale and power consumption of the graphic drawing device. As a result, there is provided an advantage of being able to lengthen the duration of the battery mounted in the graphic drawing device particularly in a case in which the graphic drawing device is a mobile phone or portable information equipment.

Embodiment 4

Figure 13:
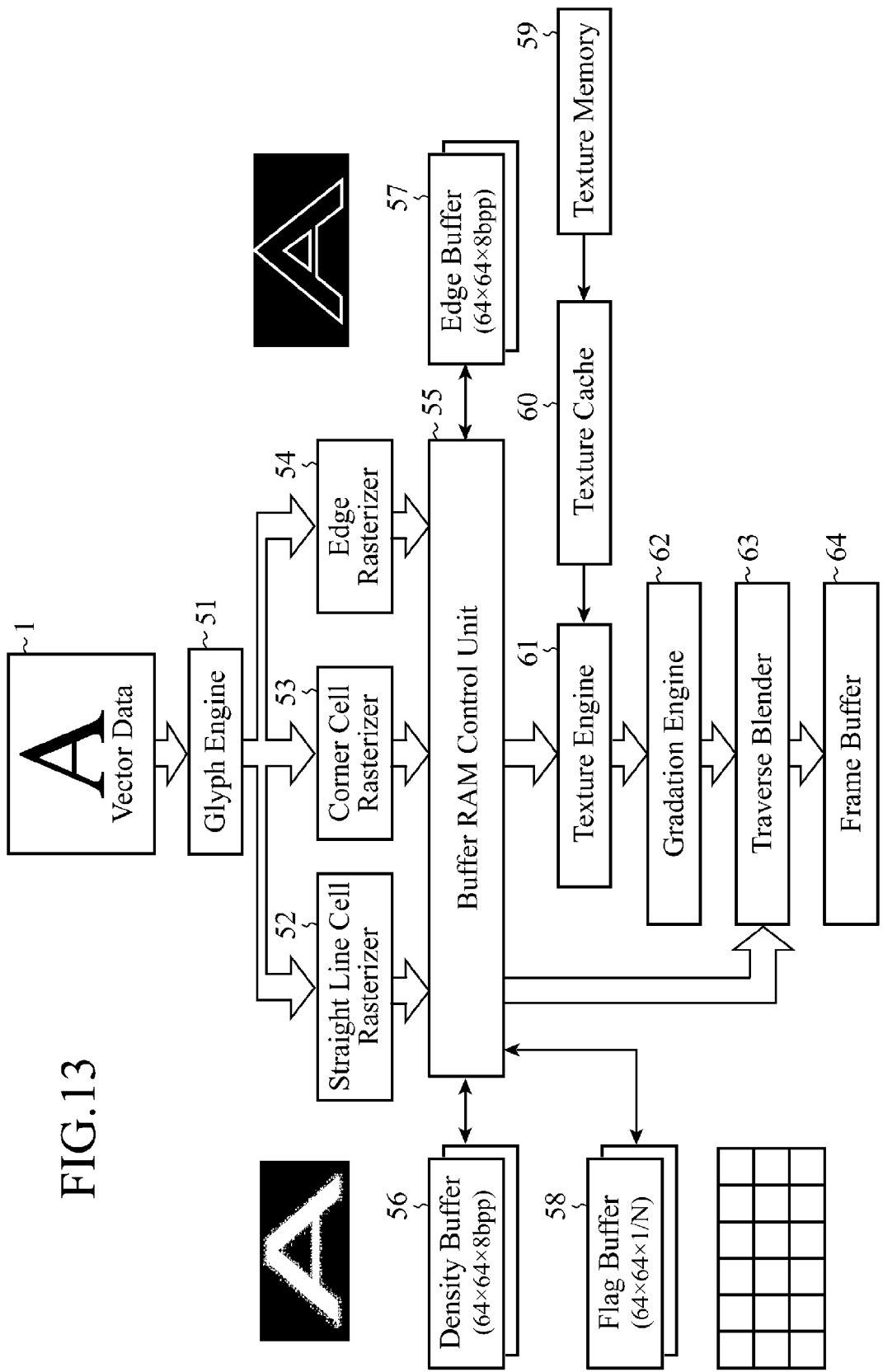
FIG. 13 is a block diagram showing a graphic drawing device which can carry out a high-speed process with a flag buffer.

FIG. 13 is a block diagram showing a graphic drawing device which is enabled to carry out a high-speed process by using a flag buffer.

In this Embodiment 4, a graphic drawing device in accordance with above-mentioned Embodiment 3 is embodied and is enabled to carry out a high-speed process by using a flag buffer.

When receiving vector data 1, a glyph engine 51 carries out matrix transformation of path data which construct the vector data 1 to divide a curved line into minute line segments.

The glyph engine 51 also calculates straight line cells, corner cells, vertex data about edges, and parameters from the divided minute line segments.

As the glyph engine 51, a programmable processor, such as a DSP, an SIMD processor, or a shader processor (a vertex shader or a pixel shader used in 3D graphics), can be used.

The glyph engine 51 also constructs a hinting means, and provides automatic hinting for carrying out high-quality font drawing with good visibility by utilizing distance information even when drawing a character having a small size.

Figure 14:
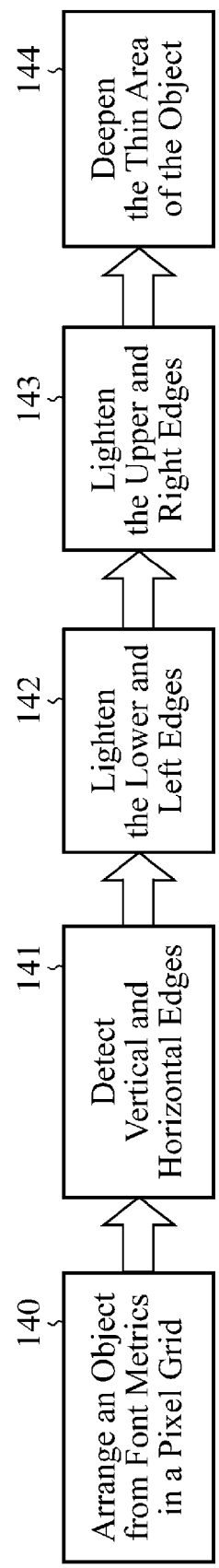
FIG. 14 is a flow chart showing the descriptions of an automatic hinting process.

FIG. 14 is a flow chart showing the descriptions of the automatic hinting process.

In the hinting, the glyph engine carries out a process of arranging an object in a grid of pixels from the straight line cells and the corner cells first (refer to 140).

The glyph engine then detects pixels on the left and lower edges of the object by using the direction of distance and gradient (refer to 141).

Next, the glyph engine deepens the detected pixels (refer to 142), thereby lightening the pixels on the opposite edges (refer to 143), to increase the contrast of the pixels on the left and lower edges without changing the stroke center of gravity based on appearance.

The glyph engine further improves the contrast against a slanting character body or a thin serif by using the distance and gradient. More specifically, by detecting a rapid change in the direction of the gradient, the glyph engine deepens the pixels on each of these light-colored areas (refer to 144).

These examples are only ones in which a visual hint is automatically provided by using the distance information. The distance information can also be used in order to provide an optimal character gap and a uniform stroke center of gravity.

A straight line cell rasterizer 52 and a corner cell rasterizer 53 carry out rasterization into a density buffer 56 by way of a buffer RAM control unit 55.

An edge rasterizer 54 carries out rasterization into an edge buffer 57.

Figure 5:
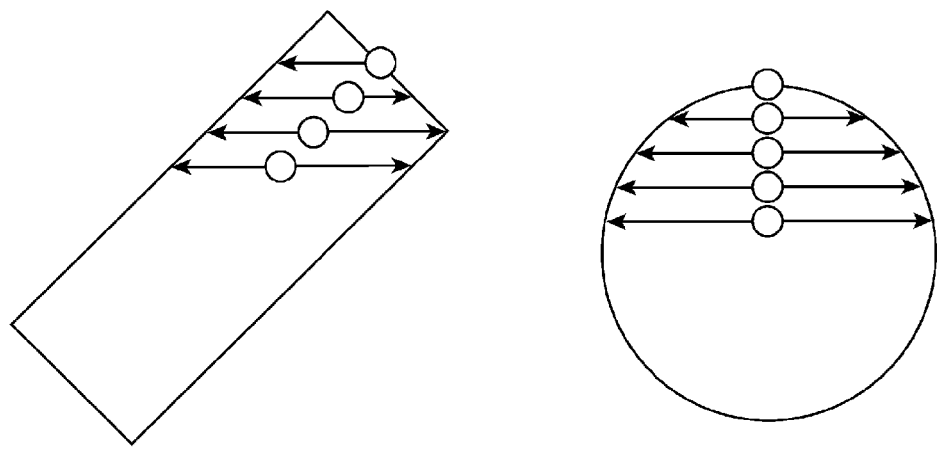
FIG. 5 is an explanatory drawing showing a straight line cell.

The order of movement of pixels in the rasterization is determined as follows. For example, in a case of a straight line cell as shown in FIG. 5, movements are performed in both rightward and leftward directions from a true edge line, and in a case of a circular cell as shown in FIG. 5, movements are performed in both rightward and leftward directions from a diameter extending in the Y-direction.

The buffer RAM control unit 55 carries out double buffer control of the density buffer 56, the edge buffer 57, and the flag buffer 58.

By using the double buffer method, the buffer RAM control unit becomes able to process drawing from each rasterizer and reading using a traverse blender 63 in parallel.

Accordingly, the throughput can be improved twice as high as that not using the double buffer method.

The flag buffer 58 stores information showing occurrence of writing of density information into the density buffer 56 with a low resolution. For example, the flag buffer holds 1-bit information for each area of 4×4 pixels, and, when writing occurs for a pixel in an area, sets the bit corresponding to this area to "1".

When reading density information from the density buffer 56, the traverse blender 63 reads only necessary density information about pixels in a drawn area.

As a result, the traverse blender can determine the area of path data drawn into the density buffer 56, and can calculate the antialiasing intensity efficiently.

A texture cache 60 caches texel data stored in a texture memory 59, thereby reducing the access latency.

A texture engine 61 calculates a texture address, reads sampling data from the texture cache 60, and performs a filtering process on the sampling data.

A gradation engine 62 carries out a color gradation arithmetic operation and a texture blend process.

Finally, the traverse blender 63 carries out a process of reading data from the density buffer 56, the edge buffer 57, and the flag buffer 58, calculating a last color value on the basis of the results of an inside or outside determining process, and writing the last color value in a frame buffer 64.

Thus, the graphic drawing device becomes able to carry out the automatic hinting by using the glyph engine 51, thereby eliminating the necessity to provide any hint data about fonts required conventionally.

Furthermore, by making the density buffer 56, the edge buffer 57, etc. have a double buffer configuration, the graphic drawing device becomes able to process the drawing and the reading in parallel, and can improve the throughput.

In addition, the graphic drawing device becomes able to read only information about a necessary area efficiently by using the flag buffer 58, and process the calculation of the antialiasing intensity at a high speed.

INDUSTRIAL APPLICABILITY

As mentioned above, the graphic drawing device in accordance with the present invention is suitable for use in equipment which converts a two-dimensional object defined in a vector format to a distance field to carry out correct antialiasing drawing with a small amount of arithmetic operation.

The invention claimed is:

1. A graphic drawing device comprising:
a buffer circuit; and
a processing circuit comprising:
a curved line dividing unit for carrying out matrix transformation of apex coordinates and control point coordinates of a curved line represented by vector data of a graphic object, and for dividing the matrix-transformed curved line into minute line segments;
a distance information generating unit for rasterizing the minute line segments through a combination of straight line cells and corner cells, for generating distance information corresponding to a pixel of a display by using a result of the rasterizing, and for storing the generated distance information into the buffer circuit, each of the corner cells being arranged to include a corner of the minute line segment and to partly overlap with the straight cell;
an edge rasterizing unit for rasterizing edge information indicating a drawing direction of the minute line segments, and for storing the rasterized edge information into the buffer circuit; and
a mapping unit
for retrieving the distance information and the edge information with respect to each pixel of the cell combination from the buffer circuit,
for determining whether said pixel is located inside or outside by using the retrieved edge information,
for adjusting a distance value indicated by the retrieved distance information in accordance with a result of the determination, and
for mapping the adjusted value of the distance information onto antialiasing intensity of a component included in said pixel.

2. The graphic drawing device according to claim 1, wherein said graphic drawing device includes a color value calculating unit for performing a color gradation arithmetic operation and a texture arithmetic operation on texture data to calculate a color value of the component included in the pixel, and the mapping unit carries out alpha blend of the color value calculated by said color value calculating unit by using the mapped antialiasing intensity.

3. The graphic drawing device according to claim 1, wherein said graphic drawing device includes an information converting unit for converting the distance information generated by the distance information generating unit into density information, and wherein the mapping unit maps the density information onto the antialiasing intensity of the component included in the pixel.

4. The graphic drawing device according to claim 3, wherein said graphic drawing device includes a flag buffer for storing information showing occurrence of writing of the density information into a density buffer.

5. The graphic drawing device according to claim 4, wherein the density buffer and the flag buffer consist of a double buffer.

6. The graphic drawing device according to claim 1, wherein said graphic drawing device includes a hinting unit for carrying out hinting of the vector data by using the distance information generated by the distance information generating unit.

7. The graphic drawing device according to claim 1, wherein the straight line cells include a quadrangular cell, and the corner cells include a circular cell.

8. A graphic drawing method comprising:
a curved line dividing step of carrying out matrix transformation of apex coordinates and control point coordinates of a curved line represented by vector data of a graphic object, and dividing the matrix-transformed curved line into minute line segments;
a distance information generating step of rasterizing the minute line segments through a combination of straight line cells and corner cells, generating distance information corresponding to a pixel of a display by using a result of the rasterizing, and storing the generated distance information into a memory, each of the corner cells being arranged to include a corner of the minute line segment and to partly overlap with the straight cell;
an edge rasterizing step of rasterizing edge information indicating a drawing direction of the minute line segments, and storing the rasterized edge information into the memory; and
a mapping step of
retrieving the distance information and the edge information with respect to each pixel of the cell combination from the memory,
determining whether said pixel is located inside or outside by using the retrieved edge information,
adjusting a distance value indicated by the retrieved distance information in accordance with a result of the determination, and
mapping the adjusted value of the distance information onto antialiasing intensity of a component included in said pixel.

9. The graphic drawing method according to claim 8, further comprising: performing, by utilizing a color value calculating unit, a color gradation arithmetic operation and a texture arithmetic operation on texture data to calculate a color value of the component included in the pixel, and carrying out, by utilizing the mapping unit, alpha blend of the color value calculated by said color value calculating unit by using the mapped antialiasing intensity.

10. The graphic drawing method according to claim 8, further comprising: converting, by utilizing an information converting unit, the distance information generated by the distance information generating unit into density information, and mapping, by utilizing the mapping unit, the density information into which the distance information is converted by said information conversion unit, instead of the distance information generated by said distance information generating unit, onto the antialiasing intensity of the component included in the pixel.

11. The graphic drawing method according to claim 10, further comprising: storing, by utilizing a flag buffer, information showing occurrence of writing of the density information into a density buffer.

12. The graphic drawing method according to claim 11, wherein the density buffer and the flag buffer consist of a double buffer.

13. The graphic drawing method according to claim 8, further comprising: carrying out hinting of the vector data by using the distance information generated by the distance information generating unit.

14. The graphic drawing method according to claim 8, wherein the straight line cells include a quadrangular cell, and the corner cells include a circular cell.

\* \* \* \* \*